United States Patent
Cheng et al.

(10) Patent No.: US 8,351,467 B2
(45) Date of Patent: Jan. 8, 2013

(54) METHODS AND SYSTEMS FOR PROVIDING MBMS DATA TO SUBSCRIBER STATIONS

(75) Inventors: Steven Cheng, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 12/367,497

(22) Filed: Feb. 6, 2009

(65) Prior Publication Data
US 2010/0202336 A1 Aug. 12, 2010

(51) Int. Cl.
*H04J 1/00* (2006.01)
(52) U.S. Cl. .................................. 370/480; 455/552.1
(58) Field of Classification Search .................. 370/480, 370/238, 312, 330; 455/552.1
See application file for complete search history.

(56) References Cited

U.S. PATENT DOCUMENTS

| | | | |
|---|---|---|---|
| 2003/0088695 A1* | 5/2003 | Kwak et al. | 709/238 |
| 2003/0224819 A1* | 12/2003 | Sanchez | 455/552.1 |
| 2005/0147127 A1* | 7/2005 | Putcha et al. | 370/480 |
| 2008/0002692 A1 | 1/2008 | Meylan et al. | |

FOREIGN PATENT DOCUMENTS

| | | |
|---|---|---|
| WO | WO2006110446 | 10/2006 |
| WO | WO2006135710 | 12/2006 |

OTHER PUBLICATIONS

International Search Report—PCT/US2010/023349, International Search Authority—European Patent Office—May 27, 2010.
Written Opinion—PCT/US2010/023349 International Search Authority European Patent Office May 27, 2010.

\* cited by examiner

*Primary Examiner* — Albert T Chou
(74) *Attorney, Agent, or Firm* — Tyler J. Overall (57) ABSTRACT

A subscriber station may receive a WiMAX connection identifier (CID) scheduling message from a 2G/3G network. The WiMAX CID scheduling message may include scheduling information that indicates when Multimedia Broadcast Multicast Service (MBMS) data for the subscriber station will be transmitted from a WiMAX network. The subscriber station may receive the MBMS data from the WiMAX network in accordance with the scheduling information.

23 Claims, 11 Drawing Sheets

METHODS AND SYSTEMS FOR PROVIDING MBMS DATA TO SUBSCRIBER STATIONS

TECHNICAL FIELD

The present disclosure relates generally to communication systems. More specifically, the present disclosure relates to methods and apparatus for providing Multimedia Broadcast Multicast Service (MBMS) data to subscriber stations.

SUMMARY

Certain embodiments include a method for receiving Multimedia Broadcast Multicast Service (MBMS) data is disclosed. The method may be implemented by a subscriber station. The method may include receiving a WiMAX connection identifier (CID) scheduling message from a 2G/3G network. The WiMAX CID scheduling message may include scheduling information that indicates when the MBMS data for the subscriber station will be transmitted from a WiMAX network. The method may also include receiving the MBMS data from the WiMAX network in accordance with the scheduling information.

Certain embodiments include a method for facilitating delivery of MBMS data to a subscriber station is also disclosed. The method may be implemented by a 2G/3G network. The method may include receiving registration from the subscriber station to receive the MBMS data. The method may also include transmitting a WiMAX connection identifier (CID) scheduling message to the subscriber station. The WiMAX CID scheduling message may include scheduling information that indicates when the MBMS data for the subscriber station will be transmitted from a WiMAX network.

Certain embodiments include a subscriber station that is configured for receiving MBMS data is also disclosed. The subscriber station includes a processor and memory in electronic communication with the processor. Instructions are stored in the memory. The instructions may be executable by the processor to receive a WiMAX connection identifier (CID) scheduling message from a 2G/3G network. The WiMAX CID scheduling message may include scheduling information that indicates when the MBMS data for the subscriber station will be transmitted from a WiMAX network. The instructions may also be executable by the processor to receive the MBMS data from the WiMAX network in accordance with the scheduling information.

Certain embodiments include a 2G/3G base station that is configured for facilitating delivery of MBMS data to a subscriber station is also disclosed. The 2G/3G base station includes a processor and memory in electronic communication with the processor. Instructions are stored in the memory. The instructions may be executable by the processor to receive registration from the subscriber station to receive the MBMS data. The instructions may also be executable by the processor to transmit a WiMAX connection identifier (CID) scheduling message to the subscriber station. The WiMAX CID scheduling message may include scheduling information that indicates when the MBMS data for the subscriber station will be transmitted from a WiMAX network.

Certain embodiments include a subscriber station that is configured for receiving MBMS data may include means for receiving a WiMAX connection identifier (CID) scheduling message from a 2G/3G network. The WiMAX CID scheduling message may include scheduling information that indicates when the MBMS data for the subscriber station will be transmitted from a WiMAX network. The subscriber station may also include means for receiving the MBMS data from the WiMAX network in accordance with the scheduling information.

Certain embodiments include a 2G/3G base station configured for facilitating delivery of MBMS data to a subscriber station may include means for receiving registration from the subscriber station to receive the MBMS data. The 2G/3G base station may also include means for transmitting a WiMAX connection identifier (CID) scheduling message to the subscriber station. The WiMAX CID scheduling message may include scheduling information that indicates when the MBMS data for the subscriber station will be transmitted from a WiMAX network.

Certain embodiments include a computer-program product for a subscriber station to receive MBMS data is also disclosed. The computer-program product may include a computer-readable medium having instructions thereon. The instructions may include code for receiving a WiMAX connection identifier (CID) scheduling message from a 2G/3G network. The WiMAX CID scheduling message may include scheduling information that indicates when the MBMS data for the subscriber station will be transmitted from a WiMAX network. The instructions may also include code for receiving the MBMS data from the WiMAX network in accordance with the scheduling information.

Certain embodiments include a computer-program product for a 2G/3G base station to facilitate delivery of MBMS data to a subscriber station is also disclosed. The computer-program product includes a computer-readable medium having instructions thereon. The instructions may include code for receiving registration from the subscriber station to receive the MBMS data. The instructions may also include code for transmitting a WiMAX connection identifier (CID) scheduling message to the subscriber station. The WiMAX CID scheduling message may include scheduling information that indicates when the MBMS data for the subscriber station will be transmitted from a WiMAX network.

DETAILED DESCRIPTION

Wireless communication systems have become an important means by which many people worldwide have come to communicate. A wireless communication system may provide communication for a number of subscriber stations, each of which may be serviced by a base station. As used herein, the term "subscriber station" refers to an electronic device that may be used for voice and/or data communication over a wireless communication system. Examples of subscriber stations include cellular phones, personal digital assistants (PDAs), handheld devices, wireless modems, laptop computers, personal computers, etc. A subscriber station may alternatively be referred to as an access terminal, a mobile terminal, a mobile station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Figure 1:
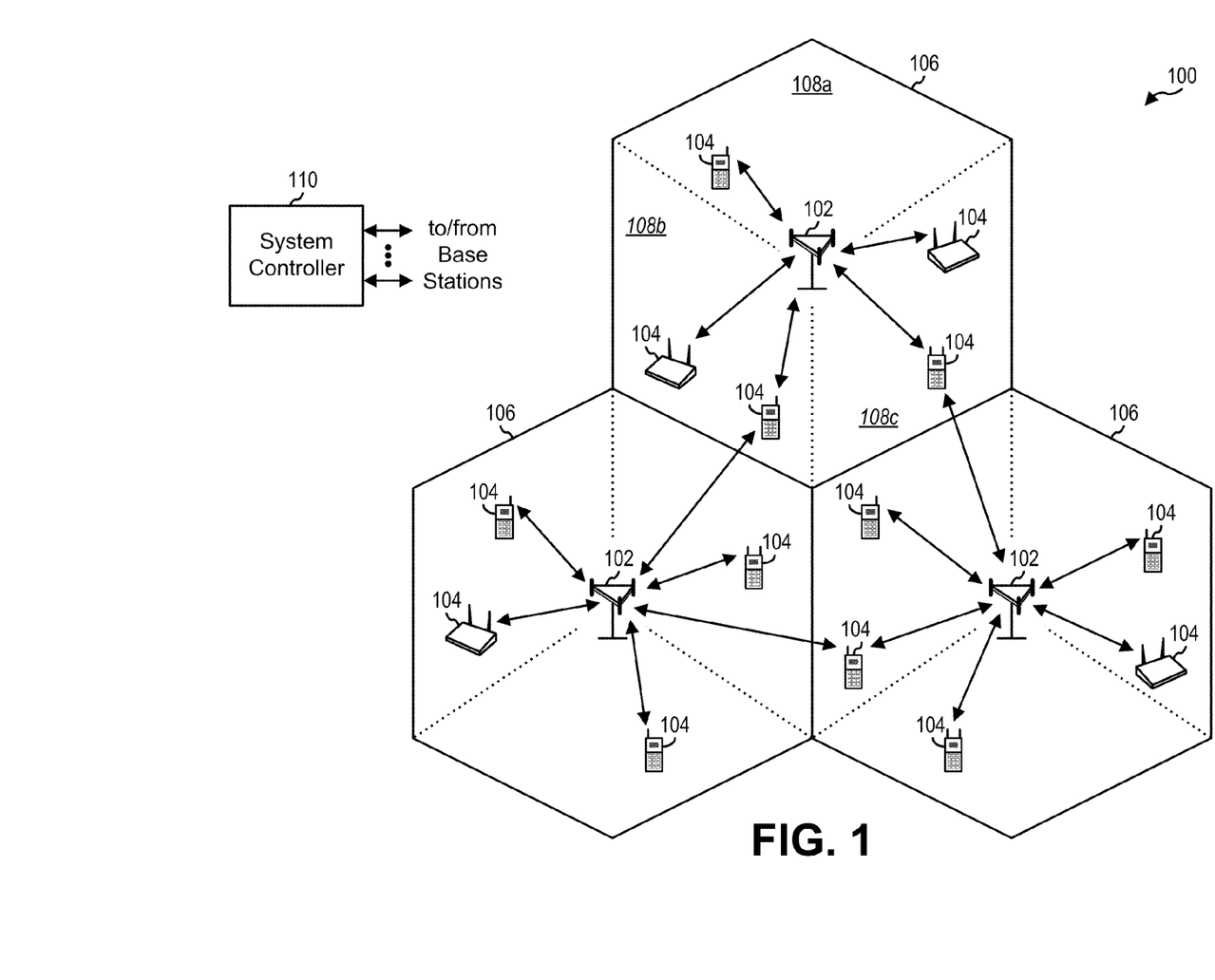
FIG. 1 shows an example of a wireless communication system in which the methods and apparatus disclosed herein may be utilized.

FIG. 1 shows an example of a wireless communication system 100 in which the methods and apparatus disclosed herein may be utilized. The wireless communication system 100 includes multiple base stations (BS) 102 and multiple subscriber stations (SS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the system 100. A subscriber station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

As used herein, the term "2G/3G network" refers to a wireless communication network that is configured in accordance with 2G and/or 3G technologies. The evolution of cellular communication systems is commonly known by IG, 2G and 3G designations. IG refers to the first cellular systems, which were analog. 2G technologies include GSM (Global System for Mobile communications), IS-95 (also known as cdmaOne), etc. 3G technologies include UMTS (Universal Mobile Telecommunications System), CDMA2000, etc.

As used herein, the term "WiMAX network" refers to a wireless communication network that is configured in accordance with one or more WiMAX standards. The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

The present disclosure relates generally to the Multimedia Broadcast Multicast Service (MBMS). MBMS is a technology for the broadcast of content (e.g., mobile television) over cellular networks to small terminals (handsets). MBMS utilizes a point-to-multi-point connection. MBMS enables a relatively wide number of channels to be provided in the network since the combination of channels can be dynamically adapted to the demand in each cell and can be multicast when several users demand the same content.

The present disclosure relates to techniques for facilitating efficient delivery of MBMS data to subscriber stations. MBMS is not a feature available to WiMAX, but is provided by the 3rd Generation Partnership Project (3GPP), which is a collaboration between groups of telecommunications associations to make a globally applicable 3G system specification. The present disclosure proposes to add a simplified WiMAX feature into the existing single mode (2G or 3G) or multi-mode (2G and 3G) subscriber stations, so the WiMAX-based MBMS service is only used for certain applications (e.g., wireless webTV). The single mode and multi-mode subscriber stations may be used as the signaling part of the proposed MBMS service, and the WiMAX protocol may be used for the proposed MBMS data broadcasting. More specifically, a WiMAX network may be used to deliver MBMS data to subscriber stations. However, scheduling information for the MBMS data may be delivered via a 2G/3G network. As will be discussed below, there are a number of reasons why this approach may be beneficial, including the fact that a WiMAX network is able to support a much higher data rate than a 2G/3G network.

WiMAX standards define a set of uplink and downlink channels. In accordance with the present disclosure, one or several downlink channels may be dedicated for MBMS services. The scheduling for each downlink channel, CID(z), is discussed below.

Figure 2:
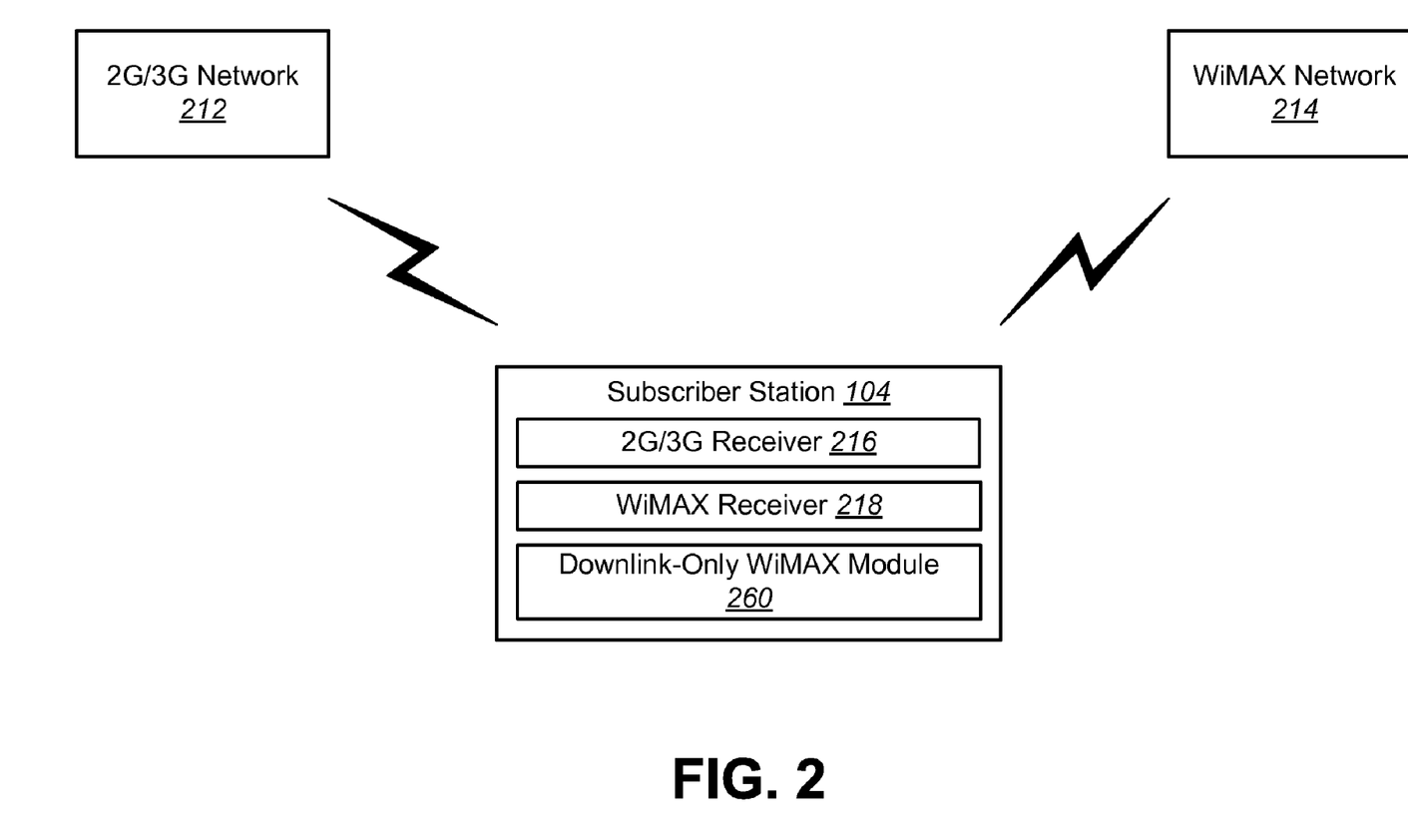
FIG. 2 illustrates a subscriber station that is configured for wireless electronic communication with a 2G/3G network and a WiMAX network.

FIG. 2 illustrates a subscriber station 104 that is configured for wireless electronic communication with a 2G/3G network 212 and a WiMAX network 214. The subscriber station 104 includes a 2G/3G receiver 216 for wireless electronic communication with the 2G/3G network 212. The subscriber station 104 also includes a WiMAX receiver 218 for wireless electronic communication with the WiMAX network 214. As will be described in greater detail below, the WiMAX receiver 218 may be activated only when the subscriber station 104 is scheduled to receive MBMS data. This may provide power savings relative to current approaches.

The WiMAX receiver 218 may be both scalable and detached, so that the WiMAX receiver 218 may be added into the subscriber station 104 at any time. In this context, the term "scalable" may mean that the user of the subscriber station 104 can select from different levels of the WiMAX receiver 218 (e.g., 1 antenna with 16 QAM, 2 antennas with 16 QAM, 4 antennas with 16 QAM, 2 antennas with 256 QAM, and 4 antennas with 256 QAM) based upon the price. Alternatively, the term "scalable" may mean that the same set of antennas (e.g., the same two antennas) may be reconfigured to serve different levels of coding and modulation schemes (e.g., ranging from QPSK to 64QAM). The term "detached" means that the 2G/3G mobile users can add the WiMAX receiver 218 as an add-on card into the existing subscriber station 104 through the USB (Universal Serial Bus) or other serial communication link provided by the existing 2G/3G subscriber station 104.

The subscriber station 104 may be configured for downlink-only WiMAX services (i.e., the subscriber station 104 may be configured to receive downlink WiMAX services but not uplink WiMAX services). Thus, the subscriber station 104 is shown with a downlink-only WiMAX module 1062. Alternatively, the subscriber station 104 may be configured for both downlink and uplink WiMAX services.

Figure 3:
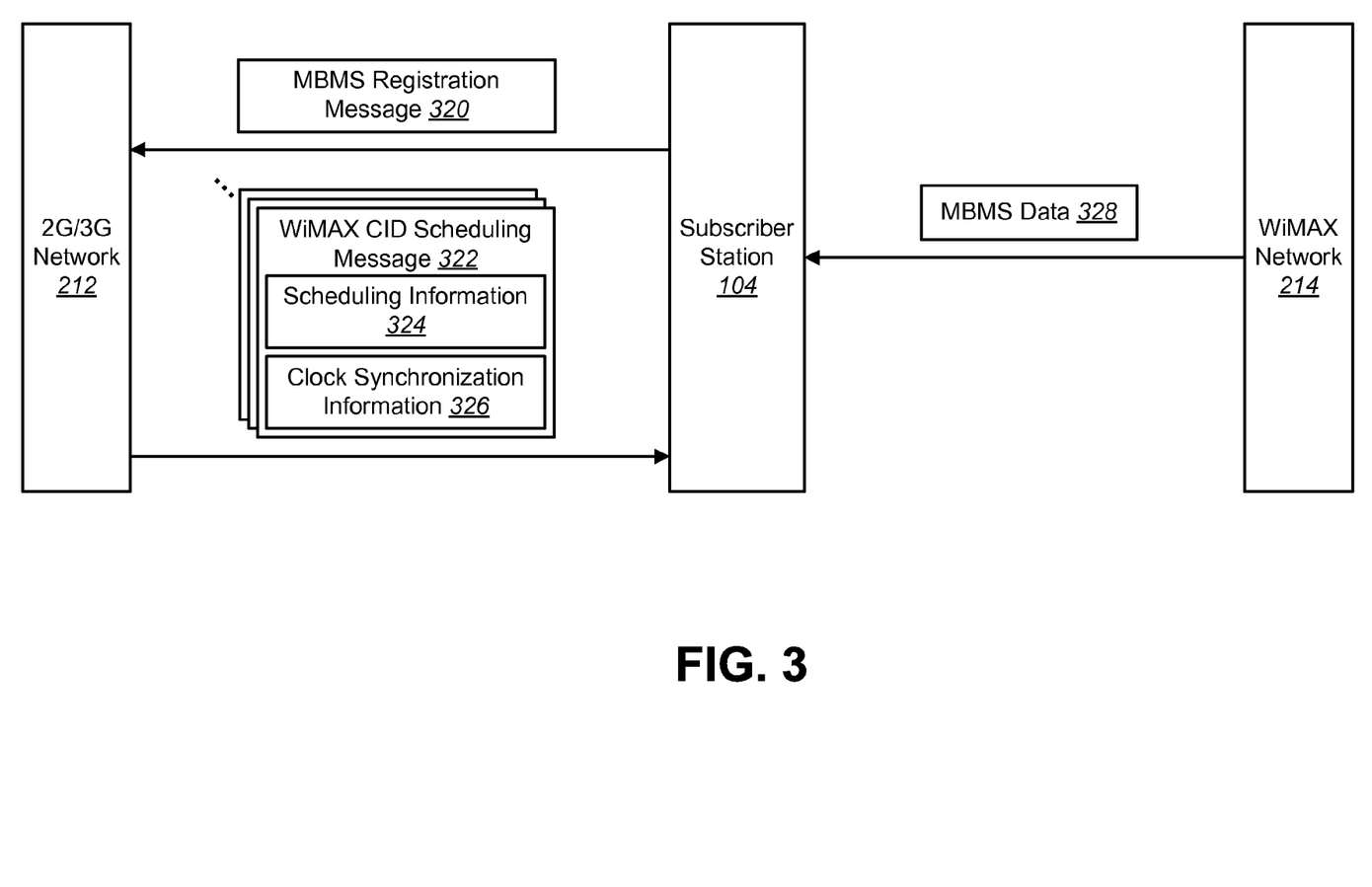
FIG. 3 illustrates messages that may be exchanged between the subscriber station and the 2G/3G network in accordance with the present disclosure.

FIG. 3 illustrates messages that may be exchanged between the subscriber station 104 and the 2G/3G network 212 in accordance with the present disclosure. The subscriber station 104 may register with the 2G/3G network 212 to receive MBMS data 328 by sending an MBMS registration message 320 to the 2G/3G network 212. In response to receiving the MBMS registration message 320, the 2G/3G network 212 may send WiMAX CID scheduling messages 322 to the subscriber station 104.

A WiMAX CID scheduling message 322 may be an L3 (i.e., connection management) message. A WiMAX CID scheduling message 322 may include scheduling information 324. The scheduling information 324 may indicate when the MBMS data 328 for the subscriber station 104 will be transmitted from the WiMAX network 214. The scheduling information 324 may include locations from the continuous frequency and symbol information, as well as the associated modulation information within a burst. The WiMAX CID scheduling message 322 may include the whole set or a subset of downlink CID channels of scheduling information 324.

The subscriber station 104 may receive the MBMS data 328 from the WiMAX network 214 in accordance with the scheduling information 324. Each WiMAX CID scheduling message 322 may be valid for a delta time plus n frames, as will be discussed in greater detail below.

A WiMAX CID scheduling message 322 may also include clock synchronization information 326, if needed. The clock synchronization information 326 may address the time difference between the 2G/3G network 212 and the WiMAX network 214. The subscriber station 104 may use the clock synchronization information 326 to synchronize with the WiMAX network 214.

Figure 4:
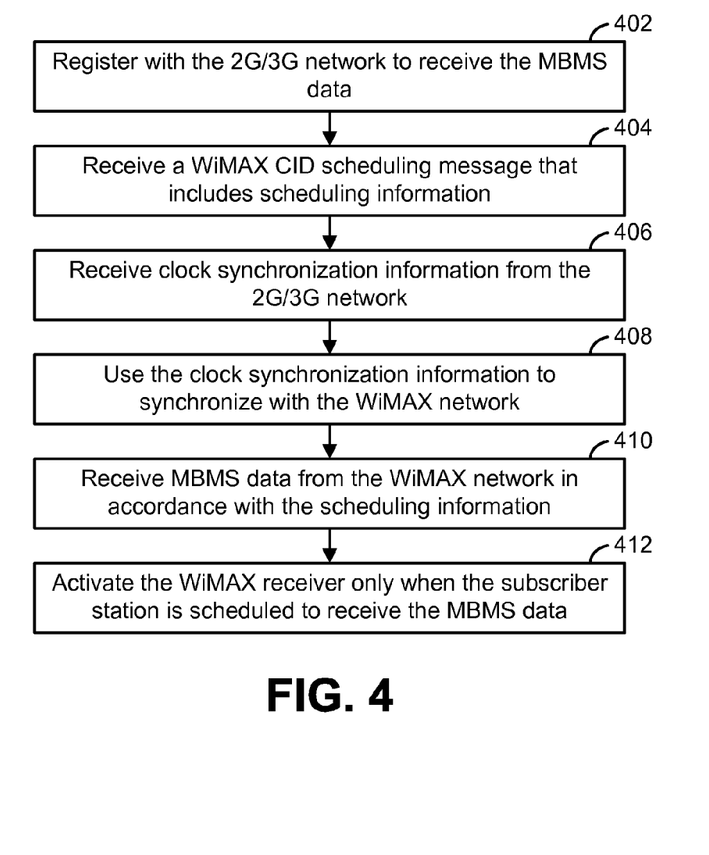
FIG. 4 illustrates a method for receiving MBMS data.

FIG. 4 illustrates a method 400 for receiving MBMS data 328. The method 400 may be implemented by a subscriber station 104.

The subscriber station 104 may register 402 with the 2G/3G network 212 to receive the MBMS data 328. This may involve sending an MBMS registration message 320 to the 2G/3G network 212.

The subscriber station 104 may receive 404 a WiMAX CID scheduling message 322 from the 2G/3G network 212. The WiMAX CID scheduling message 322 may include scheduling information 324 that indicates when the MBMS data 328 for the subscriber station 104 will be transmitted from the WiMAX network 214.

The subscriber station 104 may receive 406 clock synchronization information 326 from the 2G/3G network 212. The clock synchronization information 326 may be included in the WiMAX CID scheduling message 322. The subscriber station 104 may use 408 the clock synchronization information 326 to synchronize with the WiMAX network 214.

The subscriber station 104 may receive 410 MBMS data 328 from the WiMAX network 214 in accordance with the scheduling information 324. Advantageously, the subscriber station 104 may activate 412 the WiMAX receiver 218 only when the subscriber station 104 is scheduled to receive the MBMS data 328.

Figure 5:
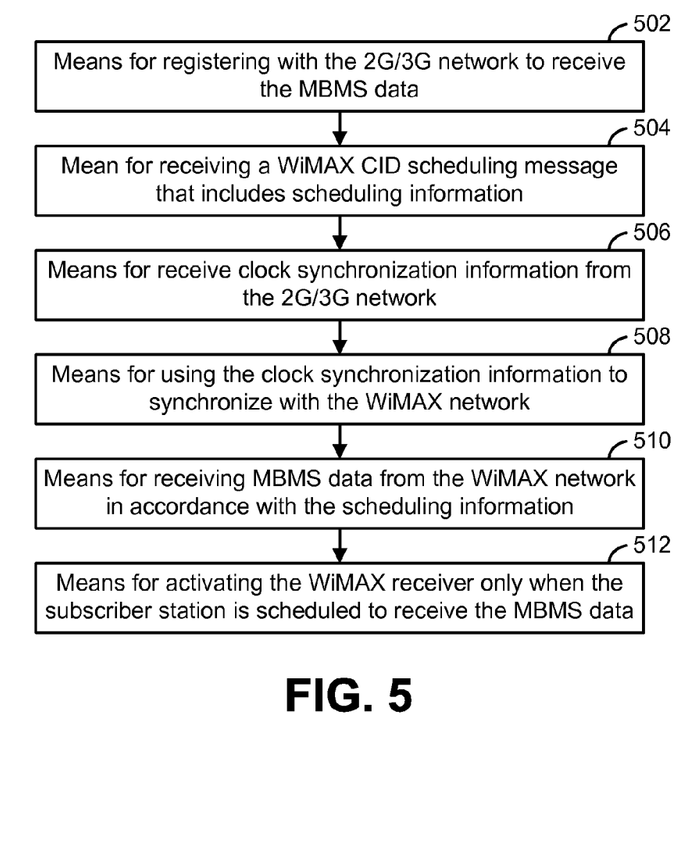
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 412 illustrated in FIG. 4 correspond to means-plus-function blocks 502 through 512 illustrated in FIG. 5.

Figure 6:
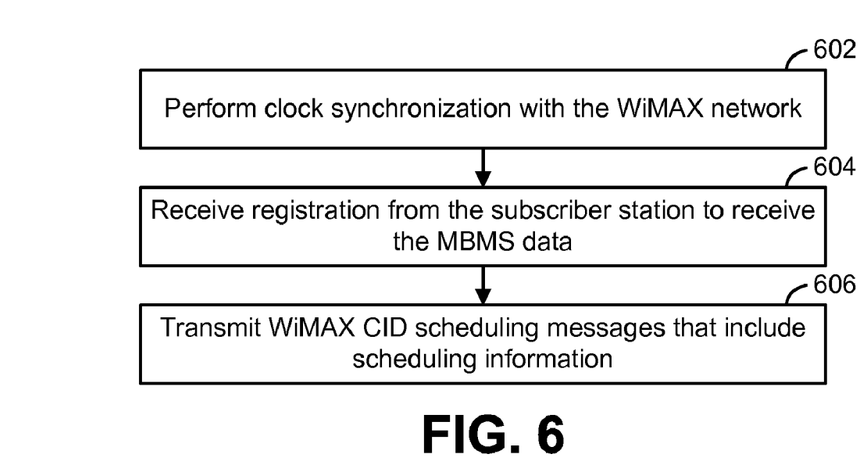
FIG. 6 illustrates a method for facilitating delivery of MBMS data to a subscriber station.

FIG. 6 illustrates a method 600 for facilitating delivery of MBMS data 328 to a subscriber station 104. The method 600 may be implemented by a 2G/3G network 212. More specifically, the method 600 may be implemented by one or more components within a 2G/3G network 212 (e.g., a 2G/3G base station).

The 2G/3G network 212 may perform 602 clock synchronization with the WiMAX network 214. The 2G/3G network 212 may receive 604 registration from the subscriber station 104 to receive the MBMS data 328. This may involve receiving an MBMS registration message 320 from the subscriber station 104. In response to receiving 604 registration from the subscriber station 104, the 2G/3G network 212 may transmit 606 WiMAX CID scheduling messages 322 to the subscriber station 104. The WiMAX CID scheduling messages 322 may include scheduling information 324 that indicates when the MBMS data 328 for the subscriber station 104 will be transmitted from the WiMAX network 214.

Figure 7:
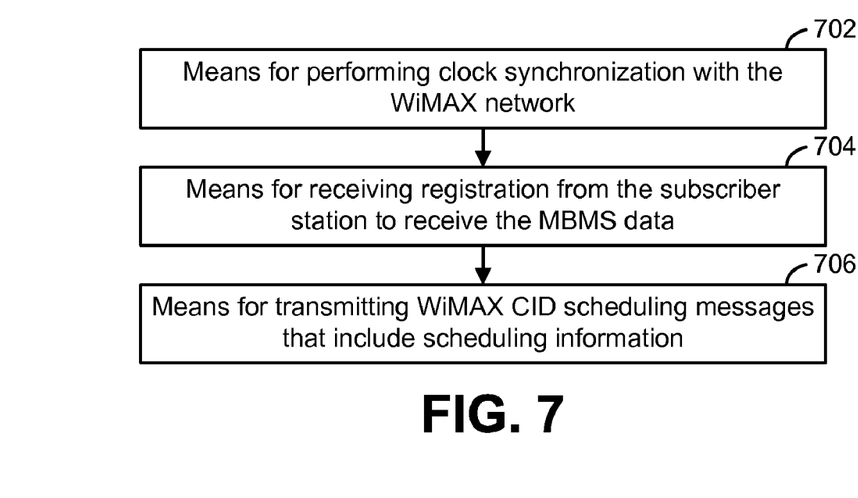
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 606 illustrated in FIG. 6 correspond to means-plus-function blocks 702 through 706 illustrated in FIG. 7.

Figure 8:
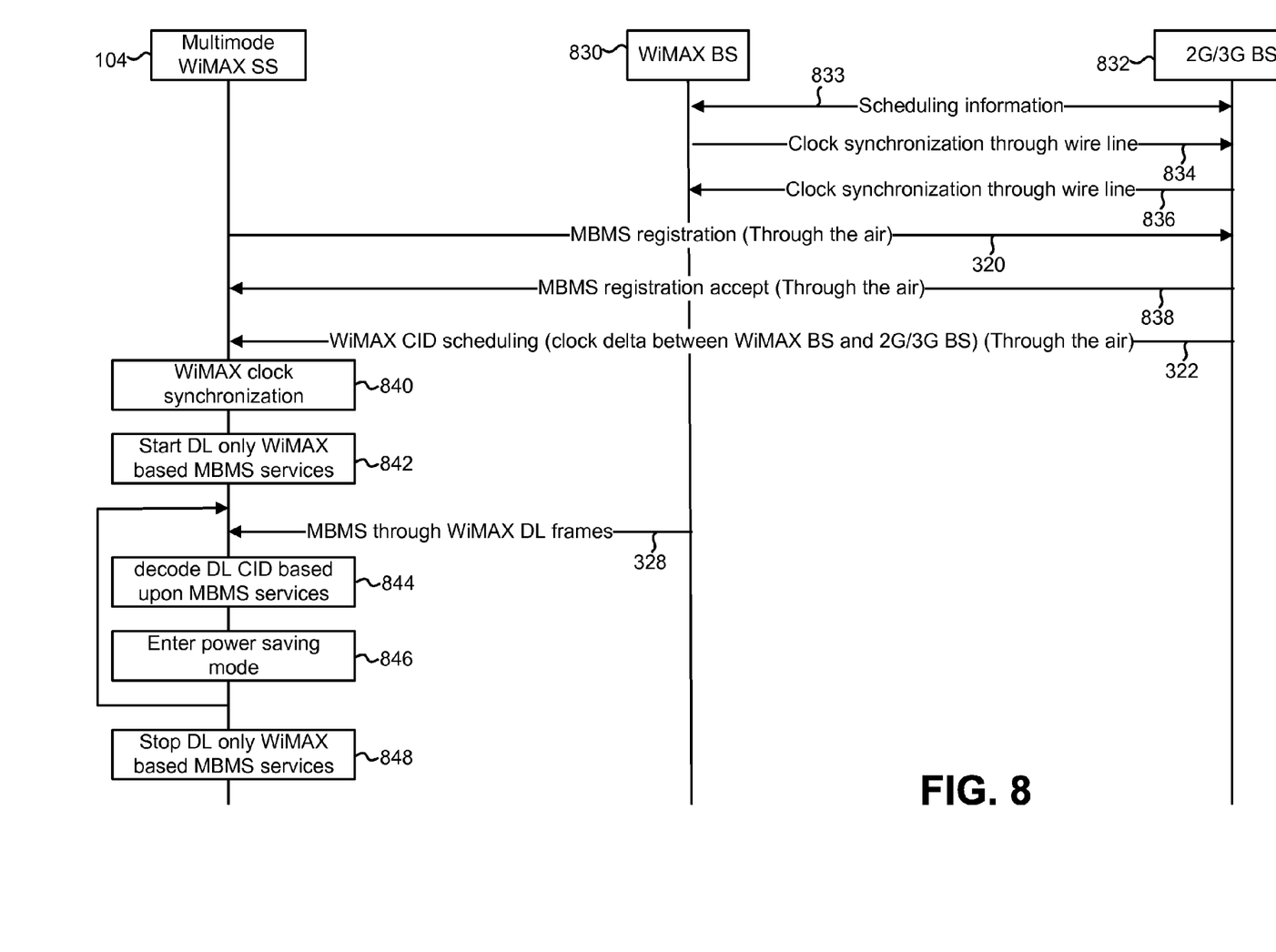
FIG. 8 illustrates a method for delivering MBMS data to a subscriber station.

FIG. 8 illustrates a method for delivering MBMS data 328 to a subscriber station 104. The method shown in FIG. 8 is a more detailed version of the methods 400, 600 shown in FIGS. 4 and 6. The method may involve a multimode WiMAX subscriber station 104, a WiMAX base station 830, and a 2G/3G base station 832. The WiMAX base station 830 may be part of the WiMAX network 214, and the 2G/3G base station 832 may be part of the 2G/3G network 212.

The 2G/3G base station 832 may receive WiMAX CID scheduling information 324 from the WiMAX base station 830. For example, there may be a message exchange 833 between the 2G/3G base station 832 and the WiMAX base station 830 to request and receive WiMAX CID scheduling information 324.

The WiMAX base station 830 and the 2G/3G base station 832 may perform clock synchronization. This may involve the WiMAX base station 830 and the 2G/3G base station 832 exchanging clock synchronization messages 834, 836. The clock synchronization messages 834, 836 may be exchanged through a wire line.

The subscriber station 104 may register with the 2G/3G base station 832 to receive the MBMS data 328. This may involve the subscriber station 104 sending an MBMS registration message 320 to the 2G/3G base station 832. The 2G/3G base station 832 may respond by sending an MBMS registration acceptance message 838 to the subscriber station 104.

The 2G/3G base station 832 may send a WiMAX CID scheduling message 322 to the subscriber station 104. The WiMAX CID scheduling message 322 may include scheduling information 324 that indicates when the MBMS data 328 for the subscriber station 104 will be transmitted from the WiMAX network 214, as well as clock synchronization information 326.

The subscriber station 104 may use the clock synchronization information 326 to perform 840 WiMAX clock synchronization. The subscriber station 104 may then start 842 downlink-only WiMAX-based MBMS services. The subscriber station 104 may receive MBMS data 328 from the WiMAX base station 830, decode 844 the downlink CID based upon MBMS services, and enter 846 power saving mode. This cycle of receiving MBMS data 328, decoding 844 the downlink CID based upon MBMS services, and entering 846 power saving mode may be repeated multiple times. At some point, the subscriber station 104 may stop 848 downlink-only WiMAX-based MBMS services.

Figure 9:
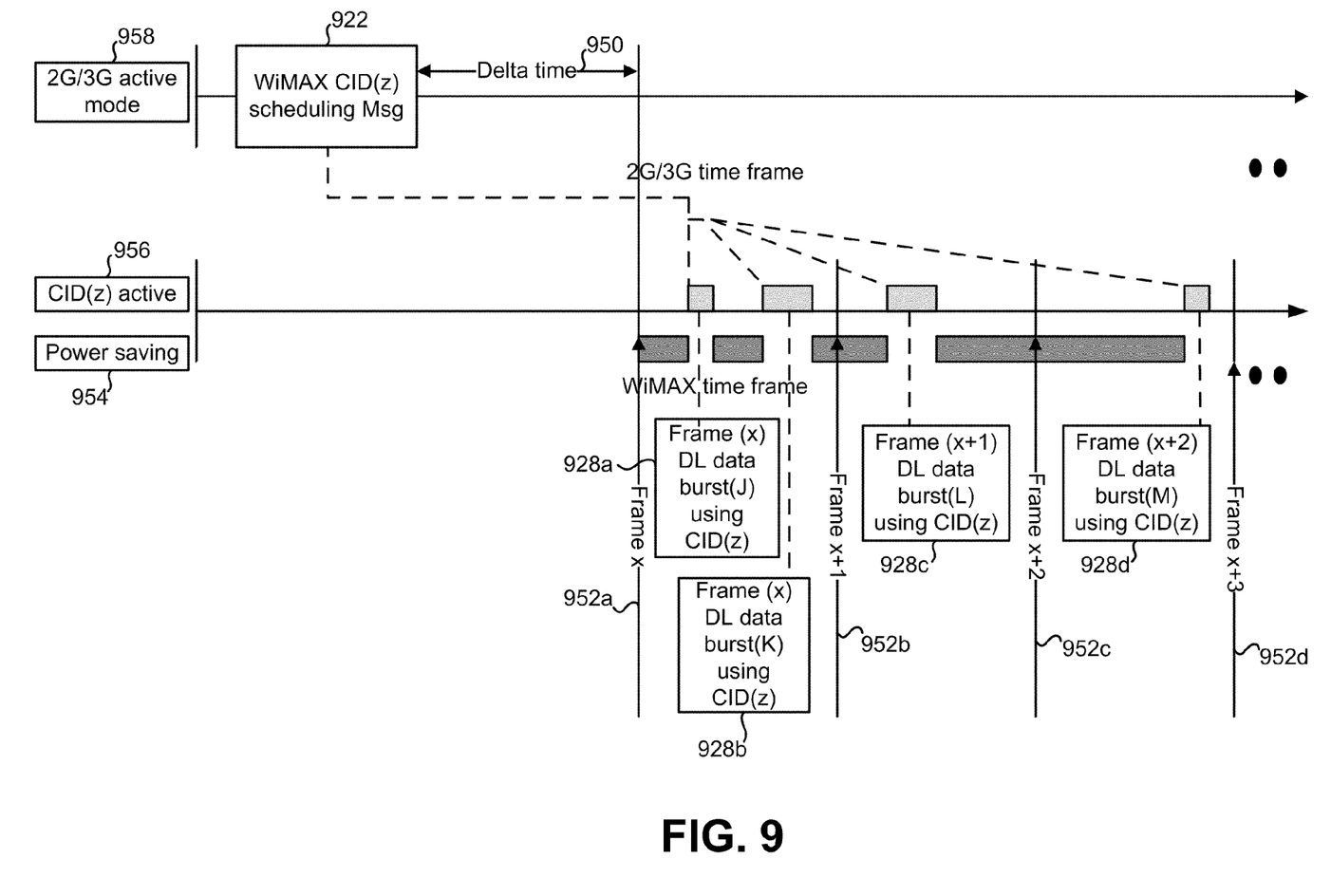
FIG. 9 illustrates an example showing how a subscriber station may respond to a WiMAX CID(z) scheduling message.

FIG. 9 illustrates an example showing how a subscriber station 104 may respond to a WiMAX CID(z) scheduling message 922. The WiMAX CID(z) scheduling message 922 may be similar to the WiMAX CID scheduling message 322 in FIG. 3 (e.g., it may include scheduling information 324 and clock synchronization information 326). The subscriber station 104 may switch to the WiMAX network 214 only when the subscriber station 104 is scheduled to receive MBMS data 928, as indicated by the scheduling information 324 in the WiMAX CID(z) scheduling message 922.

The subscriber station 104 may receive the WiMAX CID(z) scheduling message 922 while in 2G/3G active mode 958 (i.e., when the 2G/3G receiver 216 is active). The WiMAX CID(z) scheduling message 922 may be valid for a delta time 950 plus n frames.

The example shown in FIG. 9 illustrates WiMAX frame x 952a, WiMAX frame x+1 952b, WiMAX frame x+2 952c and WiMAX frame x+3 952d. Based on the scheduling information 324 within the WiMAX CID(z) scheduling message 922, the subscriber station 104 may, in frame x 952a, first enter power saving mode 954. Then, again based on the scheduling information 324, the subscriber station 104 may switch to CID(z) active mode 956 to receive and decode frame (x) 952a DL data burst (J) 928a using CID(z). The WiMAX receiver 218 may be active during CID(z) active mode 956, and the WiMAX receiver 218 may be inactive during power saving mode 954.

The subscriber station 104 may then switch back to power saving mode 954, and then back to CID(z) active mode 956 to receive and decode frame (x) 952a DL data burst (K) 928b using CID(z). The subscriber station 104 may continue in this manner, switching between CID(z) active mode 956 and power saving mode 954 based on the scheduling information 324, in order to receive and decode frame (x) 952a DL data burst (K) 928b, frame (x+1) 952b DL data burst (L) 928c, frame (x+2) 952c DL data burst (M) 928d, and so forth.

Figure 10A:
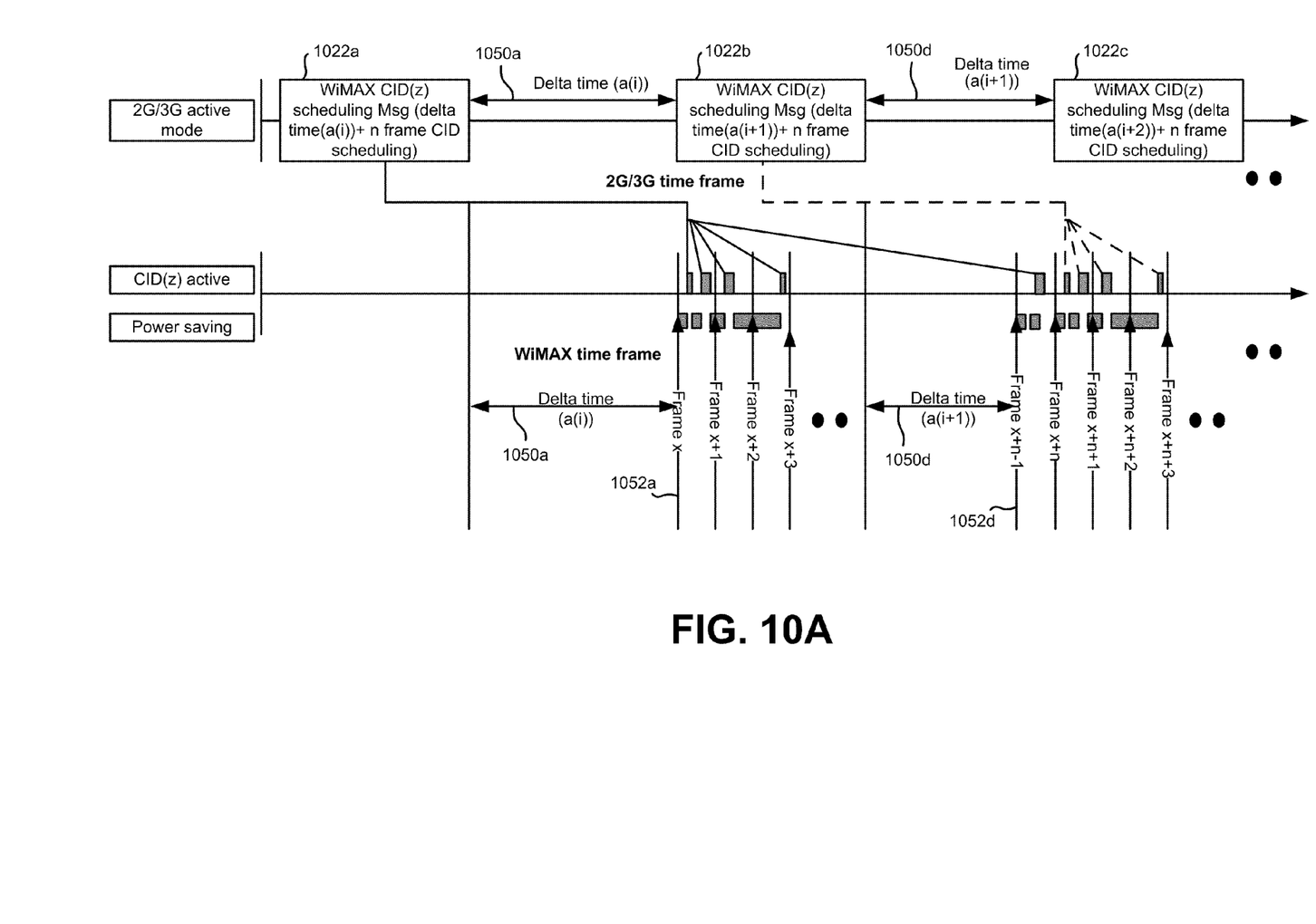
FIGS. 10A and 10B illustrate that a 2G/3G base station may send multiple WiMAX CID(z) scheduling messages.
Figure 10B:
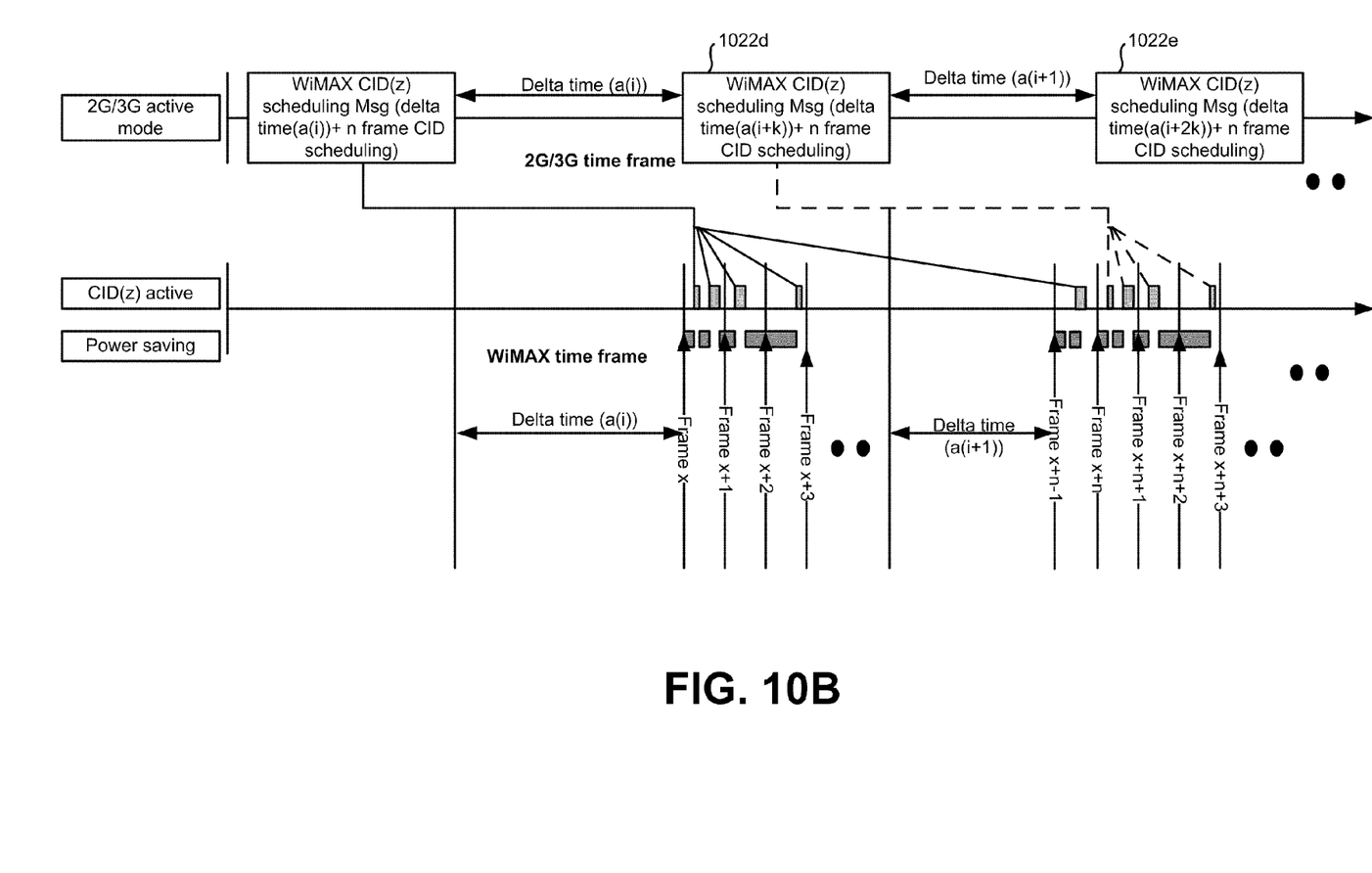

FIGS. 10A and 10B illustrate that a 2G/3G base station 832 may send multiple WiMAX CID(z) scheduling messages 1022a-e, and that the content of each WiMAX CID(z) scheduling message 1022 can be different and only valid for the subsequent delta time 1050 plus n frames. In the depicted example, the WiMAX CID(z) scheduling message 1022a that is transmitted prior to frame x 1052a is valid for a delta time a(i) 1050a plus n frames. The WiMAX CID(z) scheduling message 1022d that is transmitted prior to frame x+n−1 1052d is valid for a delta time a(i+1) 1050d plus n frames.

Figure 11:
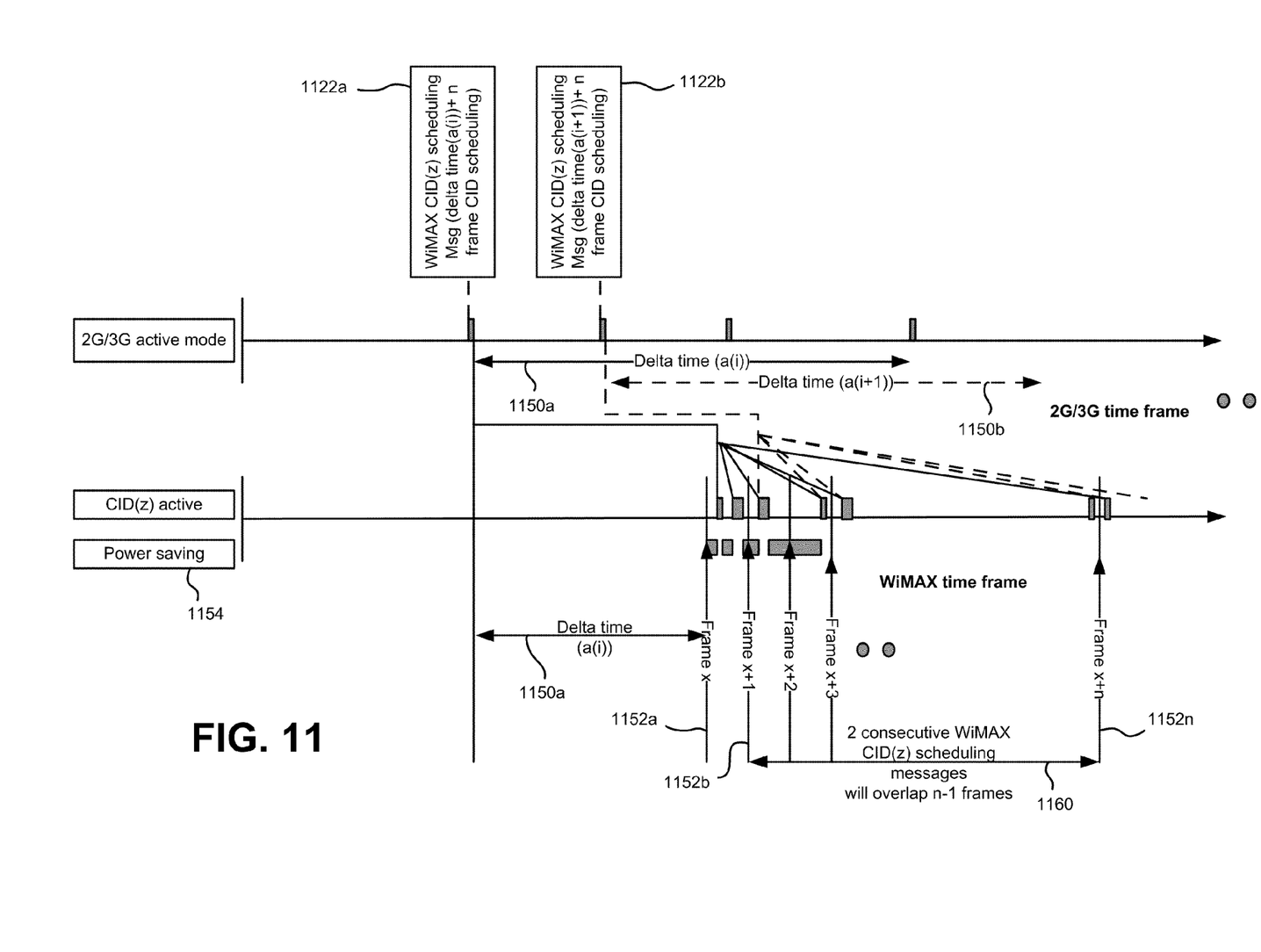
FIG. 11 illustrates that two consecutive WiMAX CID(z) scheduling messages may overlap by n−1 frames.

FIG. 11 illustrates that two consecutive WiMAX CID(z) scheduling messages 1122a, 1122b may overlap by n−1 frames. In other words, the period of time for which the first WiMAX CID(z) scheduling message 1122a is valid may overlap the period of time for which the second WiMAX CID(z) scheduling message 1122b is valid by n−1 frames.

The first WiMAX CID(z) scheduling message 1122a is valid for delta time a(i) 1150a in addition to frame x 1152a through frame x+n 1152n. The second WiMAX CID(z) scheduling message 1122b is valid for delta time a(i+1) 1150b in addition to frame x+1 1152b through frame x+n+1 (not shown). Thus, the amount of overlap 1160 is n−1 frames, as shown.

The overlap 1160 may allow both 2G/3G and WiMAX broadcasting services to share the same modem hardware at the same time. The subscriber station 104 can locate a sufficient WiMAX power saving period 1154 to switch back to the 2G/3G network 212 to receive the next WiMAX CID scheduling message 1122 and then switch back to the WiMAX network 214 without losing any WiMAX downlink broadcasting data.

A comparison will now be made between the approach disclosed herein and the following approaches for delivering MBMS data to subscriber stations: (1) MBMS through 3G networks, and (2) MBMS as part of the full version of WiMAX services.

First, MBMS through 3G networks will be discussed. In 3G networks, High Speed Downlink Packet Access (HSDPA) may be used to deliver MBMS. For 3G networks, in order to support HSDPA and MBMS services, the operators need to add E1/T1 lines to increase the backhaul wireline communication speed between the 3G base station and the control node, and the broadcasting speed is typically limited under 2 Mbps, mainly because of the cost to connect the base station and the wired network. Compared with WiMAX 802.16m, which can reach up to 350 Mbps, this kind of investment is very expensive. The radius of the current WiMAX standards (802.16e) can cover up to 10 kilometers with a service rate of 40M bps. In contrast, the radius of the 3G MBMS can cover up to 2 kilometers with a service rate of 2M bps. As a result, using WiMAX to replace the existing 3G MBMS may provide a much higher data rate with a much larger coverage area. From the network revenue perspective, it may be a much better investment to use WiMAX to replace the 3G MBMS service.

Next, MBMS as part of the full version of WiMAX services will be discussed. MBMS is a built-in feature provided by WiMAX. However, if a subscriber only needs to perform the high-speed MBMS service, such as the DVB-H (Digital Video Broadcasting-Handheld) service, and other types of traditional services provided by the 2G and 3G wireless communication protocols, then the full range of WiMAX services is an expensive approach.

Additionally, the current version of WiMAX standards requires the WiMAX subscriber stations to filter out the unrelated CID-based PDUs. However, filtering the unnecessary CID info is also a time consuming and power consuming process for subscriber stations. As discussed above, the proposed CID scheduling and WiMAX and 2G/3G time synchronization messages use the existing 2G/3G network to broadcast the WiMAX CID scheduling information, so the subscriber station may turn on the WiMAX receiving chain only when it is scheduled to receive the related CID PDUs. By doing this, the proposed approach may save more power than the existing WiMAX communications protocols from the subscriber station side.

In accordance with the present disclosure, the high-speed WiMAX for video broadcasting may be used for the initial WiMAX deployment, so the operators can use the flat rate to provide affordable high-speed WiMAX data services to the mobile users to compensate for the initial WiMAX network investment. Without any flat rate services, it may be difficult for the WiMAX services to become popular, because it may be difficult for the customers to afford the billing results.

One problem for network operators to deploy the advanced UMTS (Universal Mobile Telecommunications System) and 3GPP2 (3rd Generation Partnership Project 2) features is the uncertain mobile user subscription rate. Therefore, even though the 3G network can provide up to 14.4M bps HSDPA data rate, many wireless operators are deploying up to 1.8M bps HSDPA data rate at the initial stage for testing the market response. Using the approach disclosed herein, network operators may deploy the downlink-only WiMAX features. Since the TV broadcasting service has been in this society for many decades, it is likely that the MBMS service will be easily accepted by the mobile users. Since the coverage of the WiMAX base station is at least 10 kilometers, a large number of mobile subscribers can share the same network without any contention. Because of this fact, the cost of deploying the downlink-only WiMAX service may be easily shared by the large number of mobile users, so it is advantageous for both mobile users and network operators. Once the WiMAX investment is returned through the MBMS services, the network can have the option to upgrade the WiMAX network to include the uplink services.

By using the methods disclosed herein, the 2G/3G network operators can easily add the high-speed MBMS service into the existing subscriber stations without increasing extra network investment on the current 2G/3G network. The only extra investment is the WiMAX network used for MBMS service. As indicated above, under some circumstances, the subscriber stations may only include the downlink WiMAX feature. By doing this, WiMAX is not competing with the existing 2G and 3G wireless communications, but instead is complementing them through the MBMS services.

Figure 12:
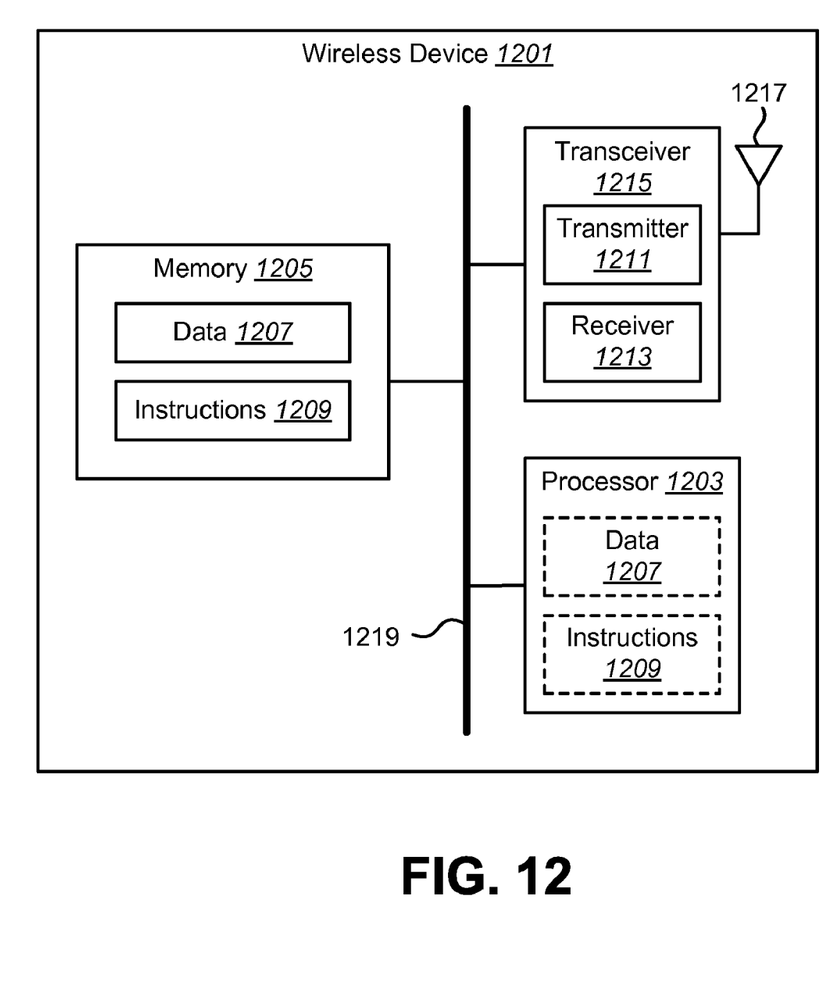
FIG. 12 illustrates certain components that may be included within a wireless device.

FIG. 12 illustrates certain components that may be included within a wireless device 1201. The wireless device 1201 may be a subscriber station or a base station.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205.

The wireless device 1201 may also include a transmitter 1211 and a receiver 1213 to allow transmission and reception of signals between the wireless device 1201 and a remote location. The transmitter 1211 and receiver 1213 may be collectively referred to as a transceiver 1215. An antenna 1217 may be electrically coupled to the transceiver 1215. The wireless device 1201 may also include (not shown) multiple transmitters, multiple receivers, multiple transceivers and/or multiple antennas.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for receiving Multimedia Broadcast Multicast Service (MBMS) data, the method being implemented by a subscriber station, the method comprising:
   receiving a connection identifier (CID) scheduling message from a 2G/3G network, wherein the CID scheduling message comprises clock synchronization information for synchronization with a second network and scheduling information that indicates when the MBMS data for the subscriber station will be transmitted from the second network, and wherein the clock synchronization information from the CID scheduling message comprises a time difference between the second network and the 2G/3G network;
   using the clock synchronization information in the CID scheduling message to synchronize with the second network; and
   receiving the MBMS data from the second network in accordance with the scheduling information.

2. The method of claim 1, further comprising activating a receiver only when the subscriber station is scheduled to receive the MBMS data.

3. The method of claim 1, further comprising registering with the 2G/3G network to receive the MBMS data.

4. A method for facilitating delivery of Multimedia Broadcast Multicast Service (MBMS) data to a subscriber station, the method being implemented by a 2G/3G network, the method comprising:
   receiving registration from the subscriber station to receive the MBMS data; and
   transmitting a connection identifier (CID) scheduling message to the subscriber station, wherein the CID scheduling message comprises clock synchronization information for synchronization by the subscriber station with a second network and scheduling information that indicates when the MBMS data for the subscriber station will be transmitted from the second network, and wherein the clock synchronization information from the CID scheduling message comprises a time difference between the second network and the 2G/3G network.

5. The method of claim 4, wherein the CID scheduling message is only valid for a delta time plus n frames.

6. The method of claim 4, further comprising transmitting multiple CID scheduling messages to the subscriber station, wherein two consecutive CID scheduling messages overlap by n−1 frames.

7. The method of claim 4, further comprising performing clock synchronization with the second network.

8. A subscriber station configured for receiving Multimedia Broadcast Multicast Service (MBMS) data, comprising:
   a processor;
   memory in electronic communication with the processor; and
   instructions stored in the memory, the instructions being executable by the processor to:
   receive a connection identifier (CID) scheduling message from a 2G/3G network, wherein the CID scheduling message comprises clock synchronization information for synchronization with a second network and scheduling information that indicates when the MBMS data for the subscriber station will be transmitted from the second network, and wherein the clock synchronization information from the CID scheduling message comprises a time difference between the second network and the 2G/3G network;

use the clock synchronization information in the CID scheduling message to synchronize with the second network; and receive the MBMS data from the second network in accordance with the scheduling information.

9. The subscriber station of claim 8, further comprising instructions executable to activate a receiver only when the subscriber station is scheduled to receive the MBMS data.

10. The subscriber station of claim 8, further comprising instructions executable to register with the 2G/3G network to receive the MBMS data.

11. A 2G/3G base station configured for facilitating delivery of Multimedia Broadcast Multicast Service (MBMS) data to a subscriber station, the 2G/3G base station configured for deployment in a 2G/3G network, comprising:

a processor;

memory in electronic communication with the processor; and instructions stored in the memory, the instructions being executable by the processor to:

receive registration from the subscriber station to receive the MBMS data; and transmit a connection identifier (CID) scheduling message to the subscriber station, wherein the CID scheduling message comprises clock synchronization information for synchronization by the subscriber station with a second network and scheduling information that indicates when the MBMS data for the subscriber station will be transmitted from the second network, and wherein the clock synchronization information from the CID scheduling message comprises a time difference between the second network and the 2G/3G network.

12. The 2G/3G base station of claim 11, wherein the CID scheduling message is a WiMAX CID scheduling message is only valid for a delta time plus n frames.

13. The 2G/3G base station of claim 11, further comprising instructions executable to transmit multiple CID scheduling messages to the subscriber station, wherein two consecutive CID scheduling messages overlap by n−1 frames.

14. The 2G/3G base station of claim 11, further comprising instructions executable to perform clock synchronization with the second network, the second network comprising a WiMAX network.

15. A subscriber station configured for receiving Multimedia Broadcast Multicast Service (MBMS) data, comprising:

means for receiving a connection identifier (CID) scheduling message from a 2G/3G network, wherein the CID scheduling message comprises clock synchronization information for synchronization with a second network and scheduling information that indicates when the MBMS data for the subscriber station will be transmitted from the second network, and wherein the clock synchronization information from the CID scheduling message comprises a time difference between the second network and the 2G/3G network;

means for using the clock synchronization information in the CID scheduling message to synchronize with the second network; and means for receiving the MBMS data from the second network in accordance with the scheduling information.

16. The subscriber station of claim 15, further comprising means for activating a receiver only when the subscriber station is scheduled to receive the MBMS data.

17. The subscriber station of claim 15, further comprising means for registering with the 2G/3G network to receive the MBMS data.

18. A 2G/3G base station configured for facilitating delivery of Multimedia Broadcast Multicast Service (MBMS) data to a subscriber station, the 2G/3G base station configured for deployment in a 2G/3G network, comprising:

means for receiving registration from the subscriber station to receive the MBMS data; and means for transmitting a connection identifier (CID) scheduling message to the subscriber station, wherein the CID scheduling message comprises clock synchronization information for synchronization by the subscriber station with a second network and scheduling information that indicates when the MBMS data for the subscriber station will be transmitted from the second network, and wherein the clock synchronization information from the CID scheduling message comprises a time difference between the second network and the 2G/3G network.

19. The 2G/3G base station of claim 18, wherein the CID scheduling message is only valid for a delta time plus n frames.

20. The 2G/3G base station of claim 18, further comprising means for transmitting multiple CID scheduling messages to the subscriber station, wherein two consecutive CID scheduling messages overlap by n−1 frames.

21. The 2G/3G base station of claim 18, further comprising means for performing clock synchronization with the network.

22. A computer-program product for a subscriber station to receive Multimedia Broadcast Multicast Service (MBMS) data, the computer-program product comprising a non-transitory computer-readable medium having instructions thereon, the instructions comprising:

code for receiving a connection identifier (CID) scheduling message from a 2G/3G network, wherein the CID scheduling message comprises clock synchronization information for synchronization with a second network and scheduling information that indicates when the MBMS data for the subscriber station will be transmitted from the second network, and wherein the clock synchronization information from the CID scheduling message comprises a time difference between the second network and the 2G/3G network;

code for using the clock synchronization information in the CID scheduling message to synchronize with the second network; and code for receiving the MBMS data from the second network in accordance with the scheduling information.

23. A computer-program product for a 2G/3G base station to facilitate delivery of Multimedia Broadcast Multicast Service (MBMS) data to a subscriber station, the 2G/3G base station configured for deployment in a 2G/3G network, the computer-program product comprising a non-transitory computer-readable medium having instructions thereon, the instructions comprising:

code for receiving registration from the subscriber station to receive the MBMS data; and code for transmitting a connection identifier (CID) scheduling message to the subscriber station, wherein the CID scheduling message comprises clock synchronization information for synchronization by the subscriber station with a second network and scheduling information that indicates when the MBMS data for the subscriber station will be transmitted from the second network, and wherein the clock synchronization information from the CID scheduling message comprises a time difference between the second network and the 2G/3G network.

* * * * *